Patented May 5, 1936

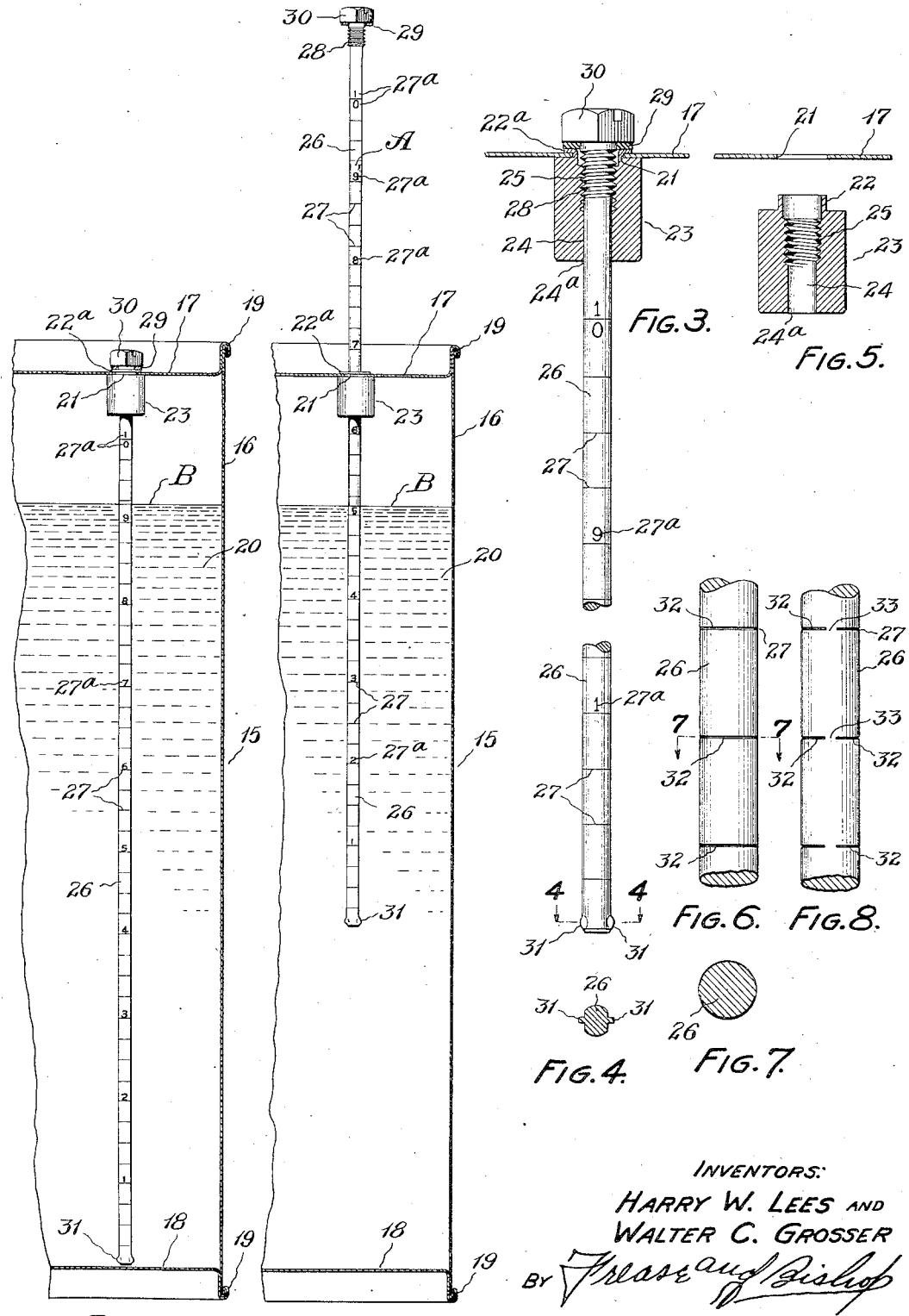

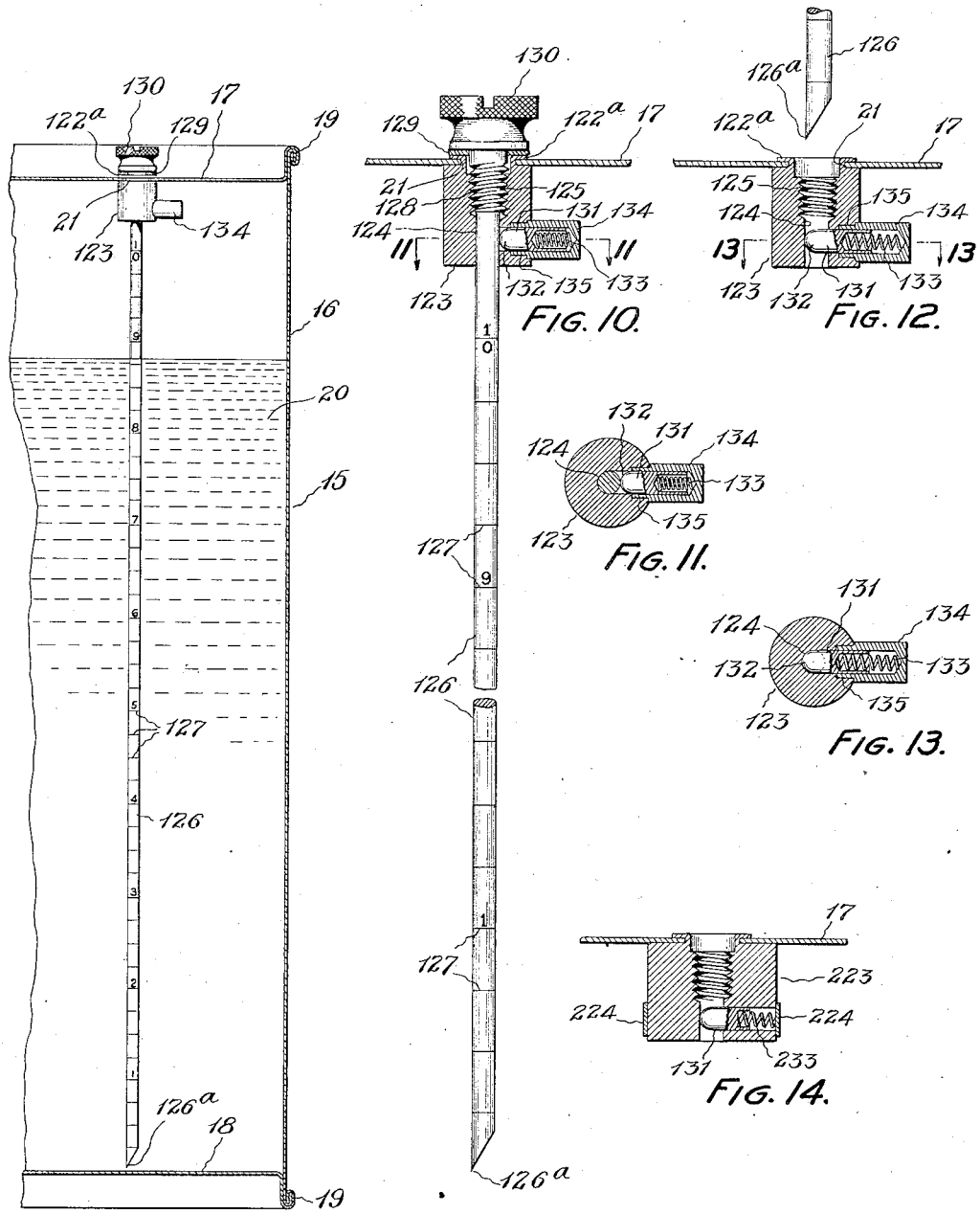

2,039,965

UNITED STATES PATENT OFFICE 2,039,965

BARREL GAUGE CONSTRUCTION

Harry W. Lees, Shaker Heights, and Walter C. Grosser, Cleveland, Ohio, assignors to The Draper Manufacturing Company, Cleveland, Ohio, a corporation of Ohio Application December 24, 1934, Serial No. 758,968

6 Claims. (Cl. 73—120)

The invention relates to gauge construction for metallic containers, barrels, drums, vessels, packages and the like utilized for shipping, storing and/or dispensing fluid or liquid materials; and relates more particularly to a gauge for measuring the contents of a container that is sealed against unauthorized access.

Portable metallic containers are extensively used for transporting, storing and dispensing various kinds of liquids, oils, lubricants and the like; and it is desired, in certain instances, to provide containers from which the contents may be dispensed in such a manner as to visibly indicate to and assure the purchaser that the contents were manufactured by and are the genuine product of the manufacturer, refiner or producer whose name appears on the container, and that the contents have not been tampered with.

For these purposes, special pumps, which form no part of the present invention, have been provided which are sealed to the container and cannot be removed by anyone but the manufacturer, producer or refiner, and which pumps can only dispense the contents and cannot be used as a means of filling the container.

It is, however, desirable if not necessary in using such containers to be able to measure the amount of liquid or lubricant which may be contained in the same at any particular time, so as to provide a way in which service station employees' sales may be checked upon.

However, the means for gauging the contents of such containers must be so constructed that the contents of the container cannot be withdrawn through the gauge connections; and must also be so constructed that no material can be introduced into the container through the gauge connections. Thus, if either ingress or egress access can be had through the gauge connection of such a container, an inferior grade of oil could be surreptitiously placed in the container and sold as the genuine product of the refiner or producer whose name appears on the container; and the containers to which the present invention pertains are designed to prevent such activities.

Moreover, the gauge connections for such gauge constructions as satisfy the requirements mentioned must be provided with a liquid-tight seal to prevent accidental leakage or seepage; and in certain cases it may be preferable to prevent disassociation of the gauge means from the container equipped with a gauge.

It is therefore an object of the present invention to provide a sealed metallic container that may only be used to dispense a genuine indicated product, with gauge means for measuring the contents thereof.

It is a further object of the present invention to provide a sealed metallic container that may only be used to dispense a genuine indicated product, with gauge means, the connections for which are provided with a liquid-tight seal.

It is likewise an object of the present invention to provide a sealed metallic container that may only be used to dispense a genuine indicated product, with gauge means so arranged that no material or substance can be entered into the container through the gauge construction.

Furthermore, it is an object of the present invention to provide a sealed metallic container that may only be used to dispense a genuine indicated product, with gauge means which cannot be completely disassociated from the container equipped with the same.

And finally, it is an object of the present invention to provide a gauge construction for a metallic container which is very simplified in design, which has a low manufacturing cost, and which incorporates some or all of the aforesaid desiderata.

These and other objects may be obtained by the elements, parts, combinations and constructions constituting the present invention, preferred embodiments of which are shown in the accompanying drawings and are hereinafter described in detail and claimed, which may be stated in general terms as including in gauge construction for a metallic container, a preferably sheet metal container wall provided with a gauge opening, a gauge socket seamed to the container wall in said opening having a gauge passage therethrough, the outer end section of said passage being provided with preferably threaded securing means, a gauge rod having indicating graduations thereon extending through said passage and having a threaded portion at its upper end for releasable engagement with the threaded passage section, said gauge rod being provided with a flanged manipulating head, a sealing gasket interposed between said head and seam, and means preventing filling of the container through said gauge passage.

In the accompanying drawings, which show the present improvements:—

Figure 1 is a fragmentary sectional view of a container equipped with the improved gauge construction showing the gauge rod in liquid sealing position within the container;

Fig. 2 is a view similar to Fig. 1, but showing the gauge rod partially withdrawn for inspecting the graduations to show a contents measurement;

Fig. 3 is an enlarged view of the gauge rod shown in Fig. 1, showing the gauge socket in section;

Fig. 4 is a sectional view of the gauge rod taken on the line 4—4, Fig. 3;

Fig. 5 comprises sectional views of a container wall and gauge socket prior to assembly thereof;

Fig. 6 is an enlarged view of a portion of the improved gauge rod;

Fig. 7 is a plan sectional view of the improved gauge rod taken on the line 7—7, Fig. 6 showing the manner in which graduation grooves are formed in the improved gauge rod;

Fig. 8 is a side view of the fragmentary portion of a gauge rod shown in Fig. 6;

Fig. 9 is a view similar to Fig. 1, showing a modified form of gauge construction;

Fig. 10 is an enlarged view of the gauge rod shown in Fig. 9, showing the socket therefor in section;

Fig. 11 is a plan sectional view taken on the line 11—11, Fig. 10;

Fig. 12 is a view similar to Fig. 10, but showing the gauge rod removed;

Fig. 13 is a plan sectional view similar to Fig. 11, taken on the line 13—13, Fig. 12; and Fig. 14 is a view similar to Fig. 12, showing a still further modified form of the construction.

Similar numerals of reference indicate corresponding parts throughout the various figures of the drawings.

A portable sheet metal container is shown at 15 and preferably includes the usual construction of side wall 16 with a top head 17 and a bottom head 18 each seamed to the side wall 16 at 19. The container 15 is termed herein and in the appended claims, a "sealed" container, which is intended to refer to a container which is sealed by a refiner, manufacturer or producer, after having been filled with a particular brand or grade of oil or other lubricant indicated at 20. The name or brand of such oil or lubricant is carried on the outside of such container and the container is so arranged that the oil or other lubricant 20 can be visibly dispensed from or withdrawn from the container; but the container cannot be filled in any manner excepting by the refiner, manufacturer or producer, to whom the container belongs.

In the form of the invention shown in Figs. 1 to 8 inclusive, the container head wall 17 is provided with an opening 21 (Fig. 5) therein; and a gauge socket 23 is positioned within the container terminating at its outer end in a neck 22 which extends through the opening 21 and is flange-seamed to and embraces the container wall 17 around the opening 21, as best indicated at 22a in Fig. 3.

The gauge socket 23 is provided with a gauge passage 24 extending through the socket, and the section of said passage adjacent to its outer end is preferably provided with internal threads 25.

A solid gauge rod 26, preferably having graduations 27 thereon, fits within and extends through the passage 24 and has an externally threaded portion 28 adjacent to its upper end for being releasably threadably secured to the threads 25 of the gauge socket 23 as best shown in Fig. 3.

A liquid-tight sealing washer or gasket 29 is interposed between the flange-seam 22a and the flanged manipulating head 30 of the gauge rod 26. The flanged head 30 laps the flange-seam so as to provide a liquid-tight connection between the gauge rod 26 and gauge socket 23, when the threads 28 and 25 are engaged.

The lower end of the gauge rod 26 is preferably provided, after the rod has been inserted through the gauge socket passage 24, with one or more outwardly projecting ears 31 which are adapted to engage the under surface of the socket to maintain closure of the passage when the rod is moved to project it from the socket; and for preventing the gauge rod from being fully withdrawn from the gauge socket.

Thus, the gauge rod 26 cannot become disassembled from the container 15 and lost; and the gauge rod 26 always closes the passage through the gauge socket so as to prevent any filling of the container through the gauge socket passage 24.

Referring to Figs. 6, 7 and 8, the graduations 27 are preferably in the form of discontinuous grooves 32, the longitudinally aligned blank spaces 33 between the ends of the grooves 32 being provided for the purpose of preventing the grooves 32 from catching on the threads 25 of the gauge socket 23 or upon any other inwardly projecting parts of the socket, when the gauge rod 26 is being moved through the gauge socket.

The gauge rod 26 is normally in the liquid-tight sealed position shown in Fig. 1; but when it is desired to perform a gauging operation, to measure the contents of the container 16 which are otherwise inaccessible because of its "sealed state", the flanged manipulating head 30 is rotated to release the threaded engagement between the securing means 25 and 28, whereupon the gauge rod may be moved to a position such as shown in Fig. 2, when a film of oil extending up to the point A will be visible on the gauge rod to indicate that the level of the fluid contents of the container is at B.

By referring the mark A to the graduations on the gauge rod which may be accompanied by designations 27a, the volume of the contents of the container may be ascertained.

Referring particularly to Figs. 3 and 5, the lower end of the passageway 24 in the socket 23 is preferably provided with a sharp corner 24a so as to scrape excess oil from the rod 26 as the rod is withdrawn for a gauging operation, in order to prevent any accumulation of oil at the upper end of the socket when the rod is again inserted into the container.

Referring to Figs. 9 to 13 inclusive, wherein a modified form of the invention is shown, the container 15 having top and bottom heads 17 and 18 seamed at 19 to the side walls 16 is provided with a gauge socket 123 flange-seamed at 122a to the container wall 17 through an opening 21 provided therein, in a manner similar to that shown in Figs. 3 and 5. The socket 123 is preferably provided with a through gauge passage 124, and the section of the passage 124 adjacent to its outer end is preferably provided with internal threads 125.

A removable solid gauge rod 126 preferably having graduations 127 thereon fits within and may be removably inserted through said passage 124; and the gauge rod 126 has an externally threaded portion 128 adjacent to its upper end for being releasably threadably secured to the threads 125 of the gauge socket 123 as best shown in Fig. 10.

A plunger 131 preferably having a rounded nose 132 is mounted in the gauge socket, and the rounded nose thereof is associated with and normally presses against the rod 126 (Fig. 10) due to the pressure of the spring 133 held within a cap 134 secured at 135 to the socket 123. When the rod 126 is moved to project it from the socket, as the point 126a thereof passes the nose 132, the plunger 131 moves, by the pressure of the spring 133, to engage a passage surface of the gauge socket (Fig. 12) to close the passage 124.

A liquid-tight sealing washer or gasket 129 is interposed between the seam 122a and flanged manipulating head 130 of the gauge rod 126 which head 130 laps the flange seam, so as to provide a liquid-tight connection between the gauge rod 126 and gauge socket 123 when the threads 128 and 125 are engaged.

The lower end of the gauge rod 126 is preferably provided at 126a with a tapered point so as to provide means for operating the plunger 131 to a retracted position such as shown in Figs. 10 and 11 upon inserting the gauge rod 126 into the gauge socket 123.

Thus, the gauge rod 126 may be removed from the container so as to enable an accurate gauging operation to be performed even when there is only a very small amount of fluid contents 20 still remaining in the container 15. The graduations 127 on the gauge rod 126 may be formed in the manner as shown in Figs. 6, 7 and 8.

Referring to Fig. 14, a modified form of gauge socket 223 is shown which only differs from the construction shown in Fig. 12 in that the socket has a larger outer diameter and the plunger spring 233 is held in position by a ring 234, the chamber for the spring being formed within the body of the socket 223.

Thus, the gauge rod 126 may be withdrawn from the container at any time it is desired to measure the contents of the container; and when withdrawn the socket passage is automatically closed by the plunger 131 so as to prevent refilling of the container through the gauge passage 125.

It is of course clear that the gauge rod may be connected to the gauge socket by other means such as by a bayonet joint rather than by threads; and such modifications, and others obvious to those skilled in the art are comprehended within the scope of the appended claims.

We claim:—

1. Gauge construction for a sealed container, including a wall having a gauge socket secured thereto, said socket being provided with a passage therethrough, a removable gauge rod extending through said passage, means on the socket and gauge rod for releasably securing said gauge rod to said gauge socket in liquid-tight sealing relation, and a spring pressed plunger closing said gauge passage when said rod is removed.

2. Gauge construction for a sealed container, including a wall having a gauge socket secured thereto, said socket being provided with a passage therethrough, a removable gauge rod extending through said passage, means on the socket and gauge rod for releasably securing said gauge rod to said gauge socket in liquid-tight sealing relation, spring pressed means automatically closing said gauge passage when said rod is removed, and said rod being provided with means for opening said spring pressed closing means.

3. Gauge construction for a portable sealed sheet metal container including a wall having a gauge socket projecting into the container and secured to the wall, said socket being provided with a passage therethrough, a gauge rod extending through said passage, means on the socket and gauge rod for releasably securing said gauge rod to said gauge socket in liquid-tight sealing relation, and means associated with said gauge rod and adapted for engaging a surface of said socket to maintain closure of said passage when the rod is moved to project it from said socket.

4. Gauge construction for a portable sealed sheet metal container including a wall having an opening therein, a gauge socket within the container provided with a through passage internally threaded adjacent to its outer end, said gauge socket terminating at its outer end in a neck extending through said opening and flange-seamed to and embracing the container wall around said opening, a solid gauge rod fitting within and extending through said passage provided adjacent to its upper end with external threads for releasable engagement with said passage threads, there being a flanged head on the upper end of said rod lapping said flange-seam, a sealing gasket interposed between said head and flange-seam to provide a liquid-tight connection between the rod and gauge socket when the threads thereof are engaged, and means associated with said gauge rod and adapted for engaging a surface of said gauge socket to maintain closure of said passage when the rod is moved to project it from said socket.

5. Gauge construction for a portable sealed sheet metal container including a wall having an opening therein, a gauge socket within the container provided with a through passage internally threaded adjacent to its outer end, said gauge socket terminating at its outer end in a neck extending through said opening and flange-seamed to and embracing the container wall around said opening, a solid gauge rod fitting within and extending through said passage provided adjacent to its upper end with external threads for releasable engagement with said passage threads, there being a flanged head on the upper end of said rod lapping said flange-seam, a sealing gasket interposed between said head and flange-seam to provide a liquid-tight connection between the rod and gauge socket when the threads thereof are engaged, and lugs on the lower end of the gauge rod adapted for engaging the under surface of the gauge socket to maintain closure of the passage when the rod is moved to project it from said socket.

6. Gauge construction for a portable sealed sheet metal container including a wall having an opening therein, a gauge socket within the container provided with a through passage internally threaded adjacent to its outer end, said gauge socket terminating at its outer end in a neck extending through said opening and flange-seamed to and embracing the container wall around said opening, a solid gauge rod fitting within and extending through said passage provided adjacent to its upper end with external threads for releasable engagement with said passage threads, there being a flanged head on the upper end of said rod lapping said flange-seam, a sealing gasket interposed between said head and flange-seam to provide a liquid-tight connection between the rod and gauge socket when the threads thereof are engaged, and a spring pressed plunger mounted on the gauge socket normally engaging the rod and adapted for movement to engage a surface of the gauge socket passage to maintain closure of the passage when the rod is moved to project it from the socket.

HARRY W. LEES.
WALTER C. GROSSER.